UNITED STATES PATENT OFFICE.

CHARLES S. PHILIPS, OF BROOKLYN, NEW YORK.

AGING AND IMPROVING THE QUALITY OF COFFEE.

SPECIFICATION forming part of Letters Patent No. 250,100, dated November 29, 1881.

Application filed July 21, 1881. (No specimens.)

*To all whom it may concern:*

Be it known that I, CHARLES S. PHILIPS, of Brooklyn, in the county of Kings and State of New York, have invented certain new and useful Improvements in the Art or Process of Aging and Improving the Quality of Coffee; and I do hereby declare that the following is a full, clear, and exact description of the invention, which will enable others skilled in the art to which it appertains to make and use the same.

The object of my invention is to eliminate the rank undesirable elements and to give to coffee in a short time that age and quality which usually requires many months, and even years. This is accomplished quickly and cheaply by the softening effects of a moist heat and direct oxidation or ozonation at the same time, or the coffee may be softened and oxidized or ozonized independently of a fermenting process; and to this end my invention consists in heating the coffee in a moist atmosphere sufficiently impregnated with ozone or oxygen to accomplish the purpose, or taking the coffee in a moist and expanded condition, and then treating it to an ozonized or oxygenated atmosphere or to oxidizing agents.

To carry my invention into effect the coffee may be placed in bulk or in bags within a room and heated in a moist atmosphere at a temperature ranging from 60° to 90° Fahrenheit, for the purpose of inducing fermentation and opening the pores of the coffee, so that the oxygen or ozone may more readily act upon it. After fermentation has been established the heat may be increased to a temperature ranging from 90° to 110° Fahrenheit, and the process of fermentation continued under such a degree of heat as will not kill it, and carried on for such a length of time as the nature of the coffee under treatment may seem to require. Usually from five to twenty days will be sufficient. The oxygen or ozone may be manufactured from the black oxide of manganese, sulphuric acid, and permanganate of potash, or other oxidizing agents. It may be introduced into the room or brought into contact with the coffee while fermenting in any way most convenient to the operator, and I do not confine myself to any particular way of manufacturing or applying it. A very convenient way is to force a blast over the chemicals and into contact with the coffee by means of a Root or other blower.

All works on chemistry specify the necessary chemicals and mechanical appliances for manufacturing oxygen—that is, by heating the chemicals in a retort; but a sufficient quantity to answer my purpose may be obtained without heating the chemicals by using a lead-lined box or other suitable vessel of any desired capacity, in which a few pounds of black oxide of manganese may be placed, and enough sulphuric acid poured upon it to form a thin mixture, which should be stirred thoroughly. A current of air may then be forced over the mixture and into contact with the coffee by means of a blower, as previously described. When it is desired to ozonize the oxygen a small quantity of permanganate of potash may be dropped into the mixture. It is not, however, essential to the oxidizing or ozonizing process that the coffee should be fermented at the same time the oxygen or ozone is applied, as it may be softened by moisture, so that the pores will be more or less expanded, and the gas applied to it while in that condition, or it may be taken after it comes from the fermenting process, when it will be already soft and pliable and susceptible to the action of the gas, which may then be applied. When oxidation is conducted independently of and without first fermenting, but by treating the coffee when in a moist condition, the process may be continued so long as the coffee remains soft enough to facilitate its action; but when the coffee has been fermented and fermentation has done all that it can do toward eliminating the rank elements, it will only be necessary for the gas to act upon the coffee for a short time—mild coffees requiring only a few hours, rank coffees from one to several days.

Where fermentation and the oxidizing process are carried on simultaneously, the oxidation or ozonation may take place only during the last one, two, or three days of the fermentation, as the coffee may seem to require.

I do not claim the process of fermenting coffee alone, as that is claimed in my application for a process of treating coffee, filed February 2, 1881. Neither do I claim the process of treating coffee by fermentation and the application of oxygen or ozone simultaneously, as that is claimed in my application filed October 11, 1881; but What I do claim, and desire to secure by Letters Patent, is—

1. The process of improving coffee, which consists in first subjecting it to the action of a moist heat, so that the berry will be expanded and the pores opened, and then treating it to oxygen or ozone for such a length of time as the coffee may continue to be improved by its action, substantially as set forth.

2. The process of aging and improving the quality of coffee, which consists in first fermenting it for from five to twenty days, or such a length of time as may be necessary to eliminate the undesirable elements, and then subjecting the coffee to the action of oxygen or ozone from one to three days, substantially as described.

CHARLES S. PHILIPS.

Witnesses:
  CHAS. H. HALLOCK,
  CHAS. S. ENSIGN.